United States Patent
Ben-Simhon et al.

(10) Patent No.: US 12,079,576 B2
(45) Date of Patent: Sep. 3, 2024

(54) UNSUPERVISED EXTRACTION OF TRENDS FROM CALL CENTER TRANSCRIPTS

(71) Applicant: INTUIT INC., Mountain View, CA (US)

(72) Inventors: Yonatan Ben-Simhon, Tel Aviv (IL); Nitzan Gado, Tel Aviv (IL); Ido Farhi, Tel Aviv (IL); Alexander Zhicharevich, Tel Aviv (IL)

(73) Assignee: INTUIT INC., Mountain View, CA (US)

( * ) Notice: Subject to any disclaimer, the term of this patent is extended or adjusted under 35 U.S.C. 154(b) by 407 days.

(21) Appl. No.: 17/491,191

(22) Filed: Sep. 30, 2021

(65) Prior Publication Data

US 2023/0107118 A1 Apr. 6, 2023

(51) Int. Cl.
*G06F 16/35* (2019.01)
*G06F 40/284* (2020.01)

(52) U.S. Cl.
CPC .......... *G06F 40/284* (2020.01); *G06F 16/35* (2019.01)

(58) Field of Classification Search
CPC .............................. G06F 16/353; G06F 16/35
See application file for complete search history.

(56) References Cited

U.S. PATENT DOCUMENTS

2020/0110882 A1* 4/2020 Ripolles Mateu .... G06F 16/353

OTHER PUBLICATIONS

Mehta, et al. "WEClustering: word embeddings based text clustering technique for large datasets, " Complex & Intelligent Systems, Apr. 2021. (Year: 2021) (Year: 2021).*
Raunak, et al. "Effective Dimensionality Reduction for Word Embeddings," 2019. (Year: 2019) (Year: 2019).*

* cited by examiner

*Primary Examiner* — Feng-Tzer Tzeng
(74) *Attorney, Agent, or Firm* — DLA Piper LLP US (57) ABSTRACT

Embodiments disclosed herein may extract trending topics from phone call transcripts or any type of text data. The phone call transcripts may be collected for a time period and the time period may be divided into time spans. For each time span having more than a threshold number of phone call transcripts, n-grams from the phone call transcripts may be extracted. The extracted n-grams may be contextually clustered by converting the n-grams into their embedding vectors, reducing the dimensionality of the embedding vectors, and clustering similar reduced dimensionality embedding vectors. Normalized occurrences of one or more clusters may be generated. The recent mean of the number of occurrences of the normalized clusters may be compared with the historical mean and offset by historical standard deviation to generate a modified Z-score. N-grams corresponding to the clusters with high Z-scores may be identified as trending topics.

18 Claims, 4 Drawing Sheets

UNSUPERVISED EXTRACTION OF TRENDS FROM CALL CENTER TRANSCRIPTS

BACKGROUND

A voluminous amount of call transcripts may be generated in a call center setting. A single call center may be receiving thousands of calls every day, and speech to text algorithms may be employed to convert the audio utterances in the calls to text files. These text files may comprise a disorganized set of information because each call may be for a different issue or for several different issues and handled by a different call center employee. Moreover, call volume may fluctuate based on the time of the day, day of the week, or other events; with no uniformity in the pattern of call transcript generation. This problem is further compounded when there are multiple, distributed call centers; each generating, at a fluctuating pace, its own call transcripts with the associated informational complexity.

For these uneven streams of call transcripts across the different call centers, there have been no efficient ways to identify yet unknown emerging patterns. Existing systems are generally reactive: whenever a problem gets sufficiently big and cannot be left unsolved (e.g., a server crashing based on an unexpected volume of service requests), the existing systems attempt to trace back to the root of the problem. Additionally, existing systems may first create a list of potential issues (e.g., customer complaining about a website by a phone call to a call center), and then run a look-up operation if these listed issues have occurred. An improvement upon these systems is therefore desirable.

DETAILED DESCRIPTION OF SEVERAL EMBODIMENTS

Embodiments disclosed herein describe systems and methods for an unsupervised and automatic identification of recurring patterns (also referred to as trending patterns) in call center transcripts. The systems and methods are unsupervised because previously unknown patterns are identified, i.e., there is no a priori knowledge of the patterns. The systems and methods are automatic because the associated software modules can run in the background to identify the patterns without human intervention. The identified recurring patterns may include any length n-grams representing words, phrases, and sentences. Furthermore, the systems and methods are language-agnostic, and may be applied to any language.

In an embodiment, a method performed by a processor comprises for a set of phone call transcripts generated over a time period, discretizing the time period into a plurality of time spans (e.g., equally sized time spans); extracting n-grams from the phone call transcripts corresponding to at least a subset of the plurality of time spans; contextually clustering the extracted n-grams, wherein the contextual clustering generates clusters of similar n-grams; determining normalized occurrences of the generated clusters in the subset of the plurality of time spans; and based on the normalized occurrences and historical occurrences, determining whether a cluster is trending.

In another embodiment, a system comprises a processor; and a non-transitory medium storing computer program instructions, that when executed by the processor cause the system to perform operations comprising: for a set of phone call transcripts generated over a time period, discretizing the time period into a plurality of time spans; extracting n-grams from the phone call transcripts corresponding to at least a subset of the plurality of time spans; contextually clustering the extracted n-grams, wherein the contextual clustering generates clusters of similar n-grams; determining normalized occurrences of the generated clusters in the subset of the plurality of time spans; and based on the normalized occurrences and historical occurrences, determining whether a cluster is trending.

Figure 1:
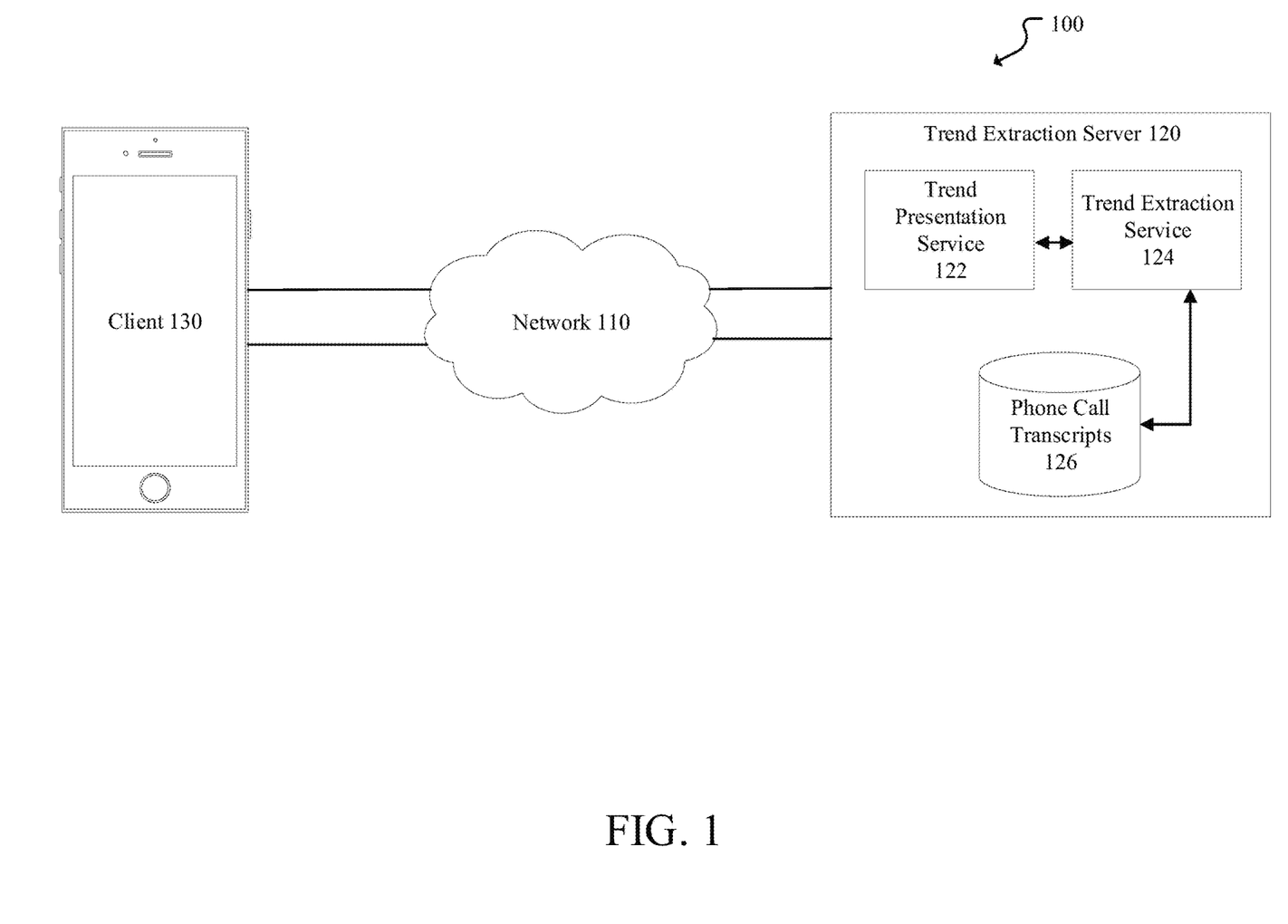
FIG. 1 shows an example system, based on the principles disclosed herein.

FIG. 1 shows a system 100 configured to extract and present trends, according to the principles disclosed herein. System 100 may include trend extraction server 120 and at least one client 130. Trend extraction server 120 and at least one client 130 may communicate with one another through at least one network 110. Network 110 may be the Internet and/or other public or private networks or combinations thereof. For example, in some embodiments, trend extraction server 120 and at least one client 130 may communicate with one another over secure channels (e.g., one or more TLS/SSL channels).

In some embodiments, client 130 may be any device configured to provide access to remote applications, e.g., remote applications provided by the trend extraction server 120. For example, client 130 may be a smartphone, personal computer, tablet, laptop computer, or other device. A user, such as an administrator (admin) user may access the extracted trends using a graphical user interface of the client 130, through the network 110. Using the client 130, the user may also provide instructions to the trend extraction server 120 to generate and display trends.

The trend extraction server 120 may comprise various hardware modules, software modules, and/or databases. As examples of these components, trend presentation service 122, trend extraction service 124, and phone call transcripts database 126 are shown. Trend extraction service 124 may, using the principles disclosed herein, access the phone call transcripts database 126 and extract the trends from the phone call transcripts stored in the phone call transcripts database 126. Trend presentation service 122 may transmit the extracted trends to client 130 and/or cause a display of the extracted trends to client 130.

Trend extraction server 120 and client 130 are each depicted as single devices for ease of illustration, but those of ordinary skill in the art will appreciate that trend extraction server 120 and/or client 130 may be embodied in different forms for different implementations. For example, trend extraction server 120 may include a plurality of devices or may be embodied in a single device or device cluster depending on embodiment. In another example, a plurality of clients 130 may be connected to network 110 and provide instructions to extract trends and also access the extracted trends. A single user may have multiple clients 130, and/or there may be multiple users each having their own client(s) 130. Furthermore, as noted above, network 110 may be a single network or a combination of networks, which may or may not all use similar communication protocols and/or techniques.

Figure 2:
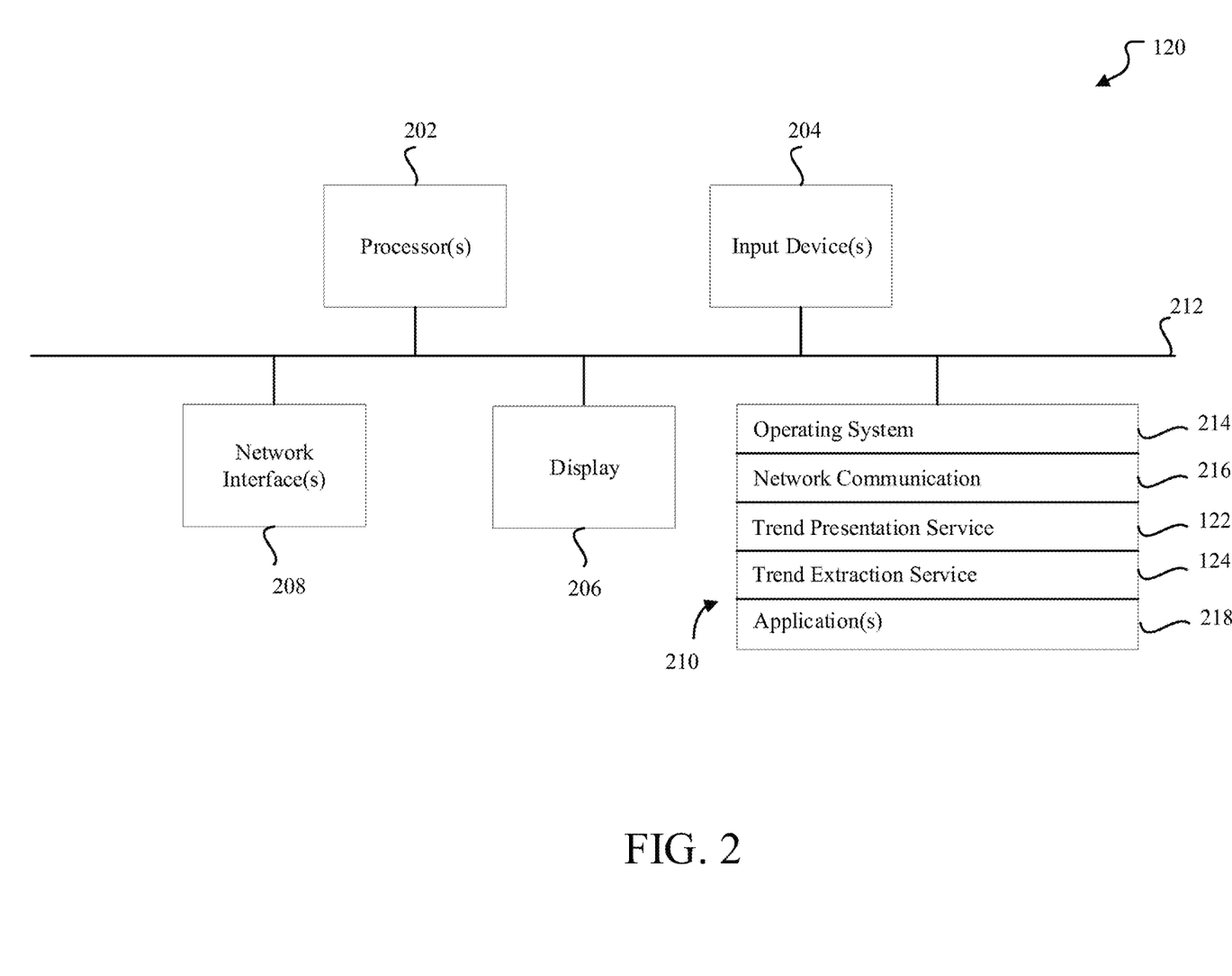
FIG. 2 shows an example computing system, based on the principles disclosed herein.

FIG. 2 is a block diagram of an example trend extraction server 120. Trend extraction server 120 may be implemented on any electronic device that runs software applications derived from instructions, including without limitation personal computers, servers, smart phones, media players, electronic tablets, game consoles, email devices, etc. In some implementations, trend extraction server 120 may include one or more processors 202, one or more input devices 204, one or more display devices 206, one or more network interfaces 208, and one or more computer-readable mediums 210. Each of these components may be coupled by bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

Trend presentation service 122 and/or trend extraction service 124 may be implemented at least in part by instructions stored in memory 210 to provide the trend presentation service 122 and/or trend extraction service 124 functionality described herein. Application(s) 220 may be an application that uses or implements the processes described herein and/or other processes. The processes may also be implemented in operating system 214.

The described features may be implemented in one or more computer programs (e.g., computer programs forming the trend extraction service 124 and/or trend presentation service 122) that may be executable on a programmable system including at least one programmable processor (e.g., processor 202) coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors (e.g., processor 202) for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories (e.g., computer readable medium 210) for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients (e.g., client 130) and servers (e.g., trend extraction server 120). A client and server may generally be remote from each other and may typically interact through a network (e.g., network 110). The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc. Using the systems described above, the following methods may be implemented.

In accordance with the disclosed principles, at the beginning of an example method for extracting the trending patterns, phone call transcripts for a time period may be collected. The time period may be, for example, two weeks. The phone call transcripts may be partitioned by utterance, for example, the transcript of the words spoken by the customer may be separated from the transcript of the words spoken by a call center agent. The time period may also be separated into time spans, which may have a fixed length (e.g., one hour). Even though some call transcripts may be for phone calls lasting more than the timespan, these calls are assigned to just one timespan. For example, for a call lasting one hour, the corresponding call transcript may be assigned to the first hour (when an hourly time span is used).

To lower noise and avoid the issue of data discontinuity because of inconsistent call center operating hours, time spans with less than a threshold amount of phone call transcripts may be filtered out. For instance, the volume of the phone calls may be lower during weekends, or even zero when the call center is closed. Analyzing these time spans may cause noisy volume measurements, for example, extracting zero n-grams may affect the downstream calculation while not providing any commensurate benefit. The filtered time spans may have data continuity (e.g., due to the time spans having more than a threshold number of phone call transcripts) even though the absolute time may have data discontinuity.

For the each of the time spans (i.e., the time spans after filtering out the time spans with less than a threshold number of phone call transcripts), n-grams may be extracted. The n-grams may represent phonemes, words, phrases, or sentences. For example, the n-grams may include bi-grams and tri-grams. The n-grams may be language agnostic and therefore may represent phonemes, words, phrases, or sentences of any kind of language. Tuples (also referred to as tokens) of the n-grams also may be generated to include other contextual information of the n-grams. An n-gram tuple may be, for example, {time span, n-gram, call_id, product, locale}, with the call_id parameter identifying the unique call from which the n-gram was extracted from, product identifying the product for which the call was made, and locale identifying the location and language of the call center that received the call.

The extracted n-gram tuples may be contextually clustered improve the signal-to-noise ratio. In other words, grouping together several semantically identical n-grams together may increase the signal. For the contextual clustering, the extracted n-gram tuples may first be converted to embedding vectors using a pre-trained model. The dimensionality of the embedding vectors may be reduced using, e.g., linear discriminant analysis. The embedding vectors with reduced dimensionality are clustered according to the similarity of the n-grams. For example, n-grams such as "double charging" and "charged twice" are grouped together. For each cluster, the highest volume n-gram may be selected as a representative of the cluster.

For each cluster, a normalized measure of occurrence per time span is generated. That is, for each time span, the number of occurrences of the different clusters may be divided by the number of calls (as represented by the number of call transcripts) for that time span. This normalization to generate a relative measure of occurrences may offset the effect of fluctuations in the volume of phone calls.

To identify the trending n-grams, a modified Z-score may be used. The modified Z-score may capture the relative increase (or decrease) of the number of recent occurrences of an n-gram relative to historical data, offset by the variability of the historical data. More specifically, for an n-gram, recent three days may be set as the recent time and past five days, not including the immediately preceding two days to the recent time, may be selected for the historical baseline. A difference between the mean of the number of recent occurrences and a mean of the number of historical mean may be calculated, and the calculated amount may be divided by the standard deviation of the number of historical occurrences. A higher positive modified Z-score may therefore indicate an increasing trend. The n-grams with top z-score may be provided for display with the contextual information (e.g., the phone call transcript containing the n-gram). Therefore, a user may automatically receive previously unknown trending topics.

The systems and method are described herein as being applied to phone call transcripts. However, this application is just an example and it should be understood that the systems and methods are applicable to any type of time-related text data, not just phone call transcripts.

Figure 3:
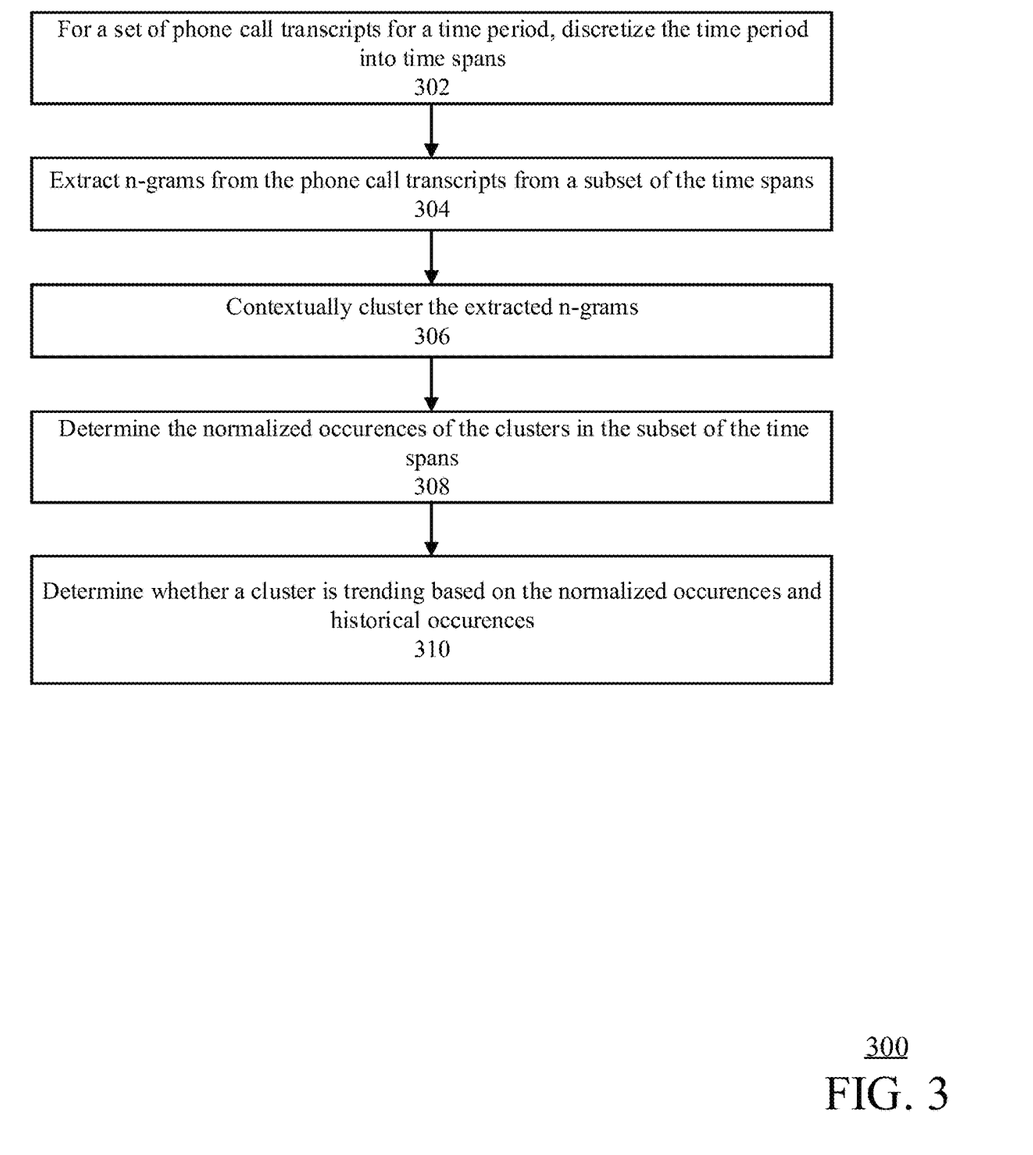
FIG. 3 is a flow diagram of an example method of extracting trending topics, based on the principles disclosed herein.

FIG. 3 shows a flowchart illustrating a method 300 of extracting trending topics, according to the principles disclosed herein. The steps of the method 300 may be performed by any type of computing device (e.g., trend extraction server). It should further be understood that the steps shown in FIG. 3 and described herein are mere examples and method with additional, alternate, and fewer number of steps should also be considered within the scope of this disclosure. Furthermore, the method 300 may be language agnostic, with the steps being applicable to any kind of language.

The method may begin at step 302, where for a set of phone call transcripts for a predetermined time period, the time period may be discretized into time spans. For instance, the time period may be two weeks and each of the time spans may be an hour. At step 304, n-grams may be extracted from the phone call transcripts from a subset of time spans. The subset of time spans may contain the time spans with more than a threshold number of call transcripts. The extracted n-grams may be phonemes, words, phrases, or sentences.

At step 306, the n-grams may be contextually clustered. The contextual clustering may include converting the n-grams into embedding vectors, reducing the dimensionality of the embedding vectors, and then clustering the reduced dimensionality embedding vectors based on their similarities. At step 308, normalized occurrences of the clusters in the subset of the time spans may be determined. That is, occurrences of the clusters for a time span may be divided by the number of phone call transcripts (indicating the number of phone calls) at the time span. This normalization may mitigate the effect of the fluctuations in call volume. At step 310, a determination is made as to whether a cluster is trending based on the normalized occurrences and historical occurrences. For the determination, a modified Z-statistic may be calculated that capture the difference between the recent mean of number of occurrences of the cluster and historical mean of the number of occurrences and offset by the historical standard deviation of the number of occurrences. A higher Z-score may indicate that the cluster may be trending.

Figure 4:
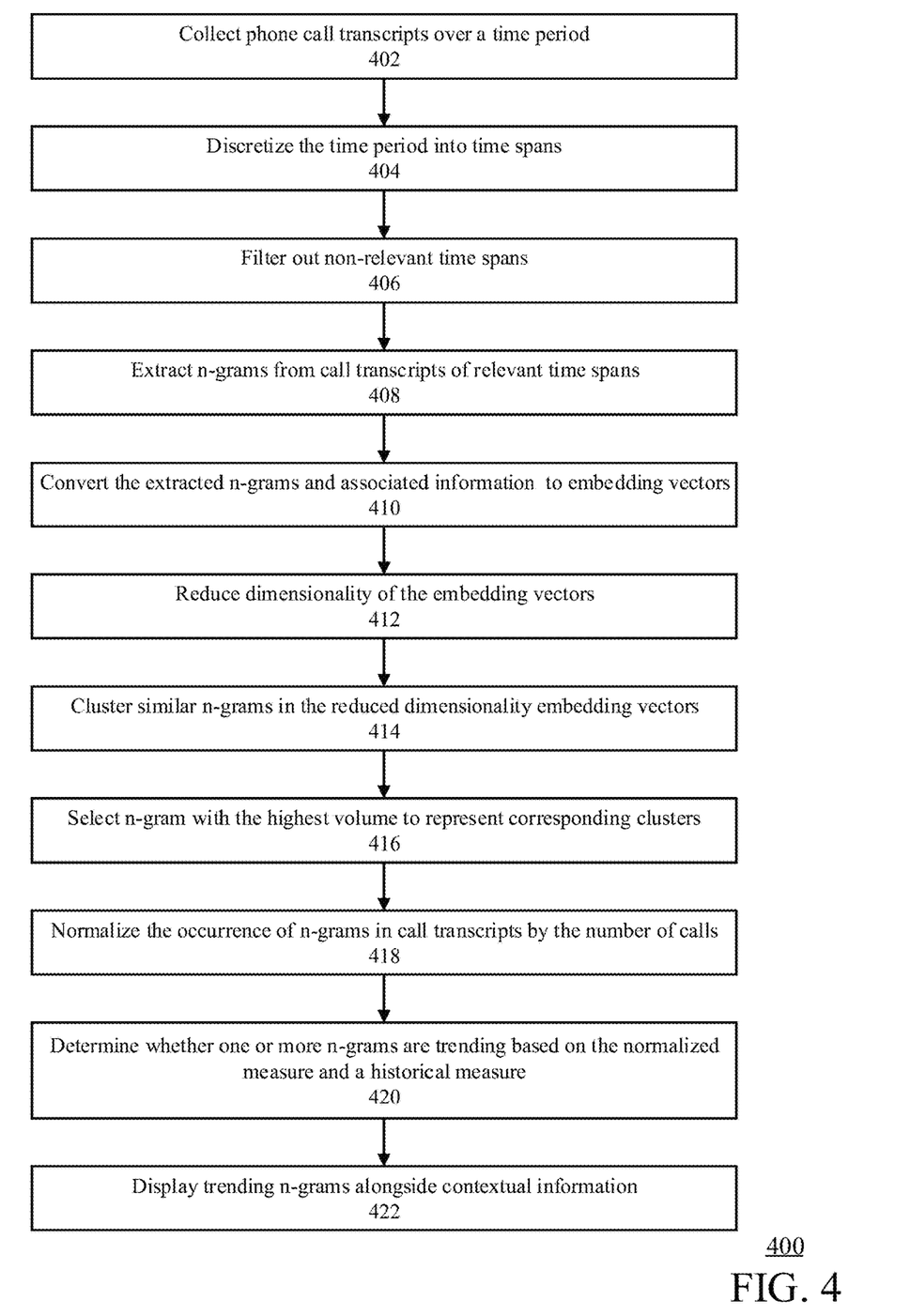
FIG. 4 is a flow diagram of another example method of extracting trending topics, based on the principles disclosed herein.

FIG. 4 shows a flowchart illustrating a method 400 of extracting trending topics (e.g., in the form of n-grams), according to principles disclosed herein. The steps of the method 400 may be performed any type of computing device (e.g., trend extraction server 120). It should further be understood the steps shown in FIG. 4 and described herein are mere examples and methods with additional, alternate, and fewer number of steps should also be considered within the scope of this disclosure. It should also be understood that the method 400 is described as being applied to phone call transcripts is just an example, and the method 400 may be applied any kind of text record. Furthermore, the method 400 may be language agnostic, and the steps of the method 400 may be applicable to any type of language.

The method 400 may begin at step 402, wherein phone call transcripts over a time period may be collected. The phone call transcripts may comprise transcribed text of phone calls from multiple callers to a call center or calls from a call center to one or more callers. A phone call transcript may therefore include utterances by multiple persons. Within the context of a call center, a phone call transcript may include utterances of a caller and a call center employee. The phone call transcripts may be partitioned by utterances. In some embodiments, the utterances of only the callers may be collected. The collection of the phone call transcripts (e.g., user utterances) may be for any desired time period. For example, the collection may be for a two week period if desired. It should be appreciated that in some embodiments, the time period may be shorter or longer than two weeks.

At step 404, the time period may be discretized into time spans. The time spans may be of any length such as few seconds, few minutes, or few hours. In an example, a time span may be an hour. The time spans may generally be fixed time spans for a simpler comparison of occurrences within the time spans, although variable time spans should also be considered within the scope of this disclosure. Each phone call transcript (e.g., a call transcript for a single phone call) may exist in only one time span. For example, if a time span is fixed at one hour and a phone call lasts two hours, the phone call transcript for the phone call may be assigned to only one hour-long time span. In other words, any of two hours may be selected (generally, the first hour), and the phone call transcript may be assigned to the selected hour and not both the hours.

At step 406, non-relevant time spans may be filtered out. The non-relevant time spans may include, for example, time spans with reduced or no call activity. In a call center setting, non-relevant time spans may be times when the call center is not open. Incorporating these time spans as having zero n-grams into the subsequent steps may introduce anomalies (e.g., including a phone call transcript with zero n-grams may affect the subsequent calculations with no concomitant inclusion benefits). Therefore, time spans with less than a threshold number of call transcripts (e.g., 50 call transcripts) may be filtered out. This filtering out may make a set of continuous time spans, even though the time spans may have discontinuities in absolute time.

At step 408, n-grams from the call transcripts of the relevant time spans may be extracted. The n-grams may include a collection of phonemes, syllables, words, phrases, or sentences. The n-grams may be bi-grams (e.g., two words such as "charged twice") tri-grams (e.g., three words such as "incorrectly charged twice"), and/or, any number of phonemes, syllables, words, phrases, or sentences. In addition to the n-grams, other associated information (e.g., contextual information) may also be extracted. For example, the associated information that is extracted may include the identification of the time span, identification of the call transcript (call_id), product associated with the call transcript (e.g., the product the call may be about), location information for the call center (e.g., west coast call center). These are but just a few examples of the associated information, and other information should also be considered within the scope of this disclosure. An example tuple (also referred to as token) based on the extracted n-gram and associated information may be: {time span, n-gram, call_id}. Another example tuple may be {time span, n-gram, call_id, product, location}.

At step 410, the extracted n-grams and associated information (both in the generated tuples or tokens) may be converted to embedding vectors. The embedding vectors may have similar representation for similar n-grams (or similar tuples containing the n-grams). This conversion may be performed using a pretrained model, such as word2vec or Glove.

At step 412, the dimensionality of the embedding vectors may be reduced. Dimensionality reduction may filter out attributes with less variability thereby reducing the number of attributes for each embedding vector. For example, the embedding vector dimensionality may be lowered to 10 by using linear discriminant analysis (LDA).

At step 414, similar n-grams in the embedding vectors with reduced dimensionality may be clustered. In some embodiments, the clustering may be performed by using DBSCAN. This clustering may group similar but not identical n-grams such as "double charging" and "charged twice." The clustering may improve the process by avoiding lack of generalization associated with finding exact matches for the n-grams.

At step 416, n-grams with the highest volume are selected to represent the corresponding clusters. Continuing with the above example, if the cluster contains the word groups such as "double charging," "charged twice," and "charged again," the number of occurrences (i.e., volume) for each of the word groups may be determined to select the word group with the highest volume. For example, if "double charging" occurs x number of times, "charged twice" occurs y number of times, "charged again" occurs z number of times with x>y>z, then "double charging" may be used to represent this cluster. However, during the count of the n-grams in a time span, all of the similar word groups may be counted, not just the representative word group.

At step 418, the occurrence of the n-grams in call transcripts may be normalized by the number of calls. Without normalization, the absolute values of the occurrences of the n-grams may not necessarily show the trends. For instance, an occurrence of an n-gram may increase with a concomitant increase with the volume of calls. In other words, because there may a higher number of calls, there may be a higher number of occurrences, which may not necessarily reflect an increasing trend. Conversely, an occurrence of an n-gram may be decreasing, but at a slower rate than the decrease in the number of calls, and therefore showing an increasing trend. To account for these fluctuations of the number of calls, the n-grams in the call transcripts, for a time span, may be divided by the number of calls for that time span.

At step 420, a determination may be made as to whether one or more n-grams are trending based on the normalized measure and historical measure. For the historical measure, a baseline may be established. As an example of baseline, 5 days of call transcripts may be analyzed to identify different n-grams and their corresponding occurrences (e.g., normalized occurrences) across the different time spans. The time spans for a historical baseline may be separated from the recent time spans (for example, by 2 days). The normalized measurement may be conducted for time spans for a day and then compared with the baseline. Based on the comparison, a z-statistic may be calculated. For example, an arithmetic mean of normalized occurrences may be calculated for the recent time spans. An arithmetic mean and a standard deviation of normalized occurrences may be calculated for the historical time spans. Based on these calculations, a z-statistic for the recent time spans may be calculated as:

$$z\text{-statistic} = (\text{recent mean} - \text{historical mean})/\text{historical standard deviation}$$

The z-statistic augments the difference between, for the normalized occurrences, the recent mean and the historical mean with the historical standard deviation. Therefore, an n-gram having normalized occurrences with a higher recent mean compared to the historical mean and with low historical variability (as indicated by the standard deviation) may be a trending n-gram. However, for an n-gram with a high variability of occurrences, a larger difference between the recent mean and the historical mean may be offset by a higher standard deviation thereby resulting in a low z-score.

At step 422, the trending n-grams is displayed alongside contextual information. For instance, for each time span, n-grams may be ranked by decreasing z-scores. A user may be allowed to set parameters for displaying the n-grams for the time spans. For instance, a user may indicate through the set parameters that the n-grams with the top three z-scores are to be displayed for each time span. For the displayed n-grams, contextual information such as the sentence or the paragraph containing the n-grams may be also be displayed. Alternatively, the contextual information may include a few words preceding and succeeding the n-gram.

The example systems and methods may provide a computationally efficient unsupervised trend extraction. There is no requirement of data labeling because the training is unsupervised. Furthermore, phone call transcripts with less than a threshold number of transcripts may be filtered out, thereby lowering the memory and processing power requirements. Additionally, the contextual clustering substantially reduces downstream calculations also lowering the memory and processing power requirements.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method performed by a processor, said method comprising:
   for a set of phone call transcripts generated over a time period, discretizing the time period into a plurality of time spans;
   generating a subset of the plurality of time spans by filtering out time spans with less than a threshold number of phone call transcripts;
   extracting n-grams from the phone call transcripts corresponding to the subset of the plurality of time spans;
   contextually clustering the extracted n-grams, wherein the contextual clustering generates clusters of similar n-grams;
   determining normalized occurrences of the generated clusters in the subset of the plurality of time spans; and
   based on the normalized occurrences and historical occurrences, determining whether a cluster is trending.

2. The method of claim 1, wherein each of the plurality of time spans has a fixed length.

3. The method of claim 1, further comprising:
   generating, for the extracted n-grams, corresponding tokens with additional contextual information.

4. The method of claim 3, wherein contextually clustering the extracted n-grams comprises:
   converting the tokens to embedding vectors;
   reducing dimensionality of the embedding vectors; and
   grouping similar n-grams into the clusters, based on the reduced dimensionality embedding vectors.

5. The method of claim 4, further comprising:
   selecting, as a representative of a cluster, an n-gram with the largest number of occurrences in the cluster.

6. A method performed by a processor, said method comprising:
   for a set of phone call transcripts generated over a time period, discretizing the time period into a plurality of time spans;
   extracting n-grams from the phone call transcripts corresponding to at least a subset of the plurality of time spans;
   contextually clustering the extracted n-grams, wherein the contextual clustering generates clusters of similar n-grams;
   determining normalized occurrences of the generated clusters in the subset of the plurality of time spans by:
      for each cluster, dividing the number of occurrences of the cluster in a time span by the number of call transcripts for the time span; and
   based on the normalized occurrences and historical occurrences, determining whether a cluster is trending.

7. The method of claim 1, wherein determining whether a cluster is trending comprises:
   determining a first arithmetic mean of normalized occurrences of the cluster in recent time spans and a second arithmetic mean of normalized occurrences of the cluster in time spans prior to the recent time spans;
   determining a standard deviation of the normalized occurrences of the cluster in time spans prior to the recent time spans; and
   calculating a trending score for the cluster based on the first arithmetic mean, the second arithmetic mean, and the standard deviation.

8. The method of claim 1, further comprising:
in response to determining that the cluster is trending, providing for display an n-gram associated with the cluster.

9. The method of claim 8, further comprising:
providing for display contextual information in a phone call transcript corresponding to the n-gram.

10. A system comprising:
a processor; and
a non-transitory medium storing computer program instructions, that when executed by the processor cause the system to perform operations comprising:
   for a set of phone call transcripts generated over a time period, discretizing the time period into a plurality of time spans;
   generating a subset of the plurality of time spans by filtering out time spans with less than a threshold number of phone call transcripts;
   extracting n-grams from the phone call transcripts corresponding to the subset of the plurality of time spans;
   contextually clustering the extracted n-grams, wherein the contextual clustering generates clusters of similar n-grams;
   determining normalized occurrences of the generated clusters in the subset of the plurality of time spans; and
   based on the normalized occurrences and historical occurrences, determining whether a cluster is trending.

11. The system of claim 10, wherein each of the plurality of time spans has a fixed length.

12. The system of claim 10, the operations further comprising:
generating for the extracted n-grams, corresponding tokens with additional contextual information.

13. The system of claim 12, wherein the operation of contextually clustering the extracted n-grams further comprises:
converting the tokens to embedding vectors;
reducing dimensionality of the embedding vectors; and
grouping similar n-grams into the clusters, based on the reduced dimensionality embedding vectors.

14. The system of claim 13, the operations further comprising:
selecting, as a representative of a cluster, an n-gram with the largest number of occurrences in the cluster.

15. The system of claim 10, wherein the operation of determining normalized occurrences of the generated clusters in the subset of the plurality of time spans further comprises:
for each cluster, dividing the number of occurrences of the cluster in a time span by the number of call transcripts for the time span.

16. The system of claim 10, wherein the operation of determining whether a cluster is trending further comprises:
determining a first arithmetic mean of normalized occurrences of the cluster in recent time spans and a second arithmetic mean of normalized occurrences of the cluster in time spans prior to the recent time spans;
determining a standard deviation of the normalized occurrences of the cluster in time spans prior to the recent time spans; and
calculating a trending score for the cluster based on the first arithmetic mean, the second arithmetic mean, and the standard deviation.

17. The system of claim 10, the operations further comprising:
in response to determining that the cluster is trending, providing for display an n-gram associated with the cluster.

18. The system of claim 17, the operations further comprising:
providing for display, contextual information in a phone call transcript corresponding to the n-gram.

\* \* \* \* \*